Sept. 29, 1953  W. C. CASSADY  2,653,388
COMBINATION DOOR AND JAMB GAUGE
Filed Oct. 5, 1951
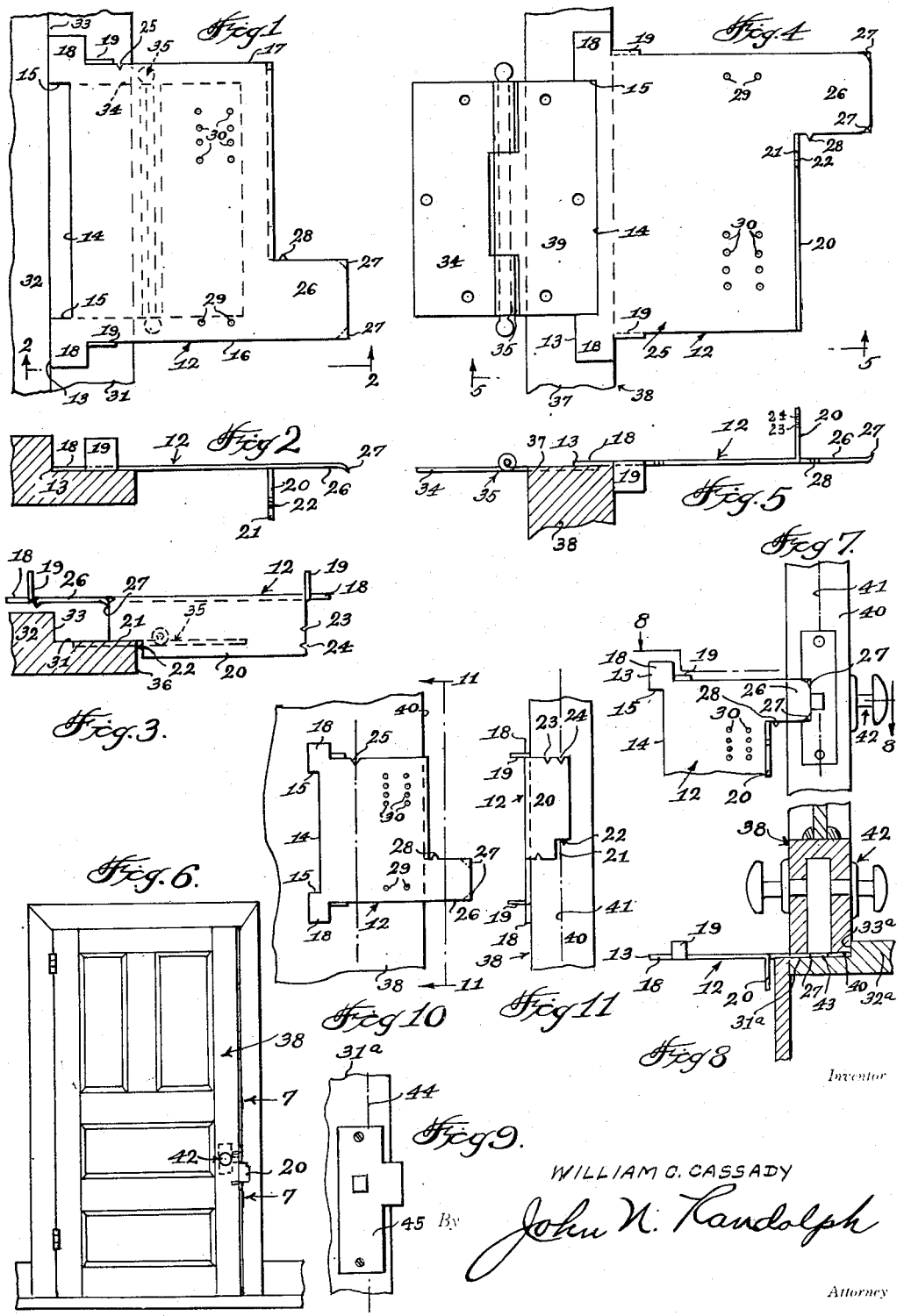
Inventor
WILLIAM C. CASSADY
By John N. Randolph
Attorney Patented Sept. 29, 1953

2,653,388

UNITED STATES PATENT OFFICE 2,653,388

COMBINATION DOOR AND JAMB GAUGE

William C. Cassady, Vancouver, Wash.

Application October 5, 1951, Serial No. 249,995

3 Claims. (Cl. 33—197)

This invention relates to a combination gauge of extremely simple construction for use in connection with the hanging of doors, the application of locks and handles thereto and the positioning of hinges and strike plates on the door jambs whereby the door may be hung with extreme accuracy both as to its hinged mounting and as to the closing and latching of the door.

More particularly, it is an aim of the invention to provide a gauge of extremely simple construction having no moving parts and which is so constructed that the various parts thereof may be employed for accurately marking off and locating door hinges, strike plates, door latches and locks, and door handles and which will insure a correct positioning of the different parts.

Still another object of the invention is to provide a gauge which may be accurately employed in the doors of different thicknesses and by means of which door edges and door jambs may be accurately marked off for mortising on the hinge leaves to be secured thereto.

Various other objects and advantages of the invention will hereinafter become more fully apparent from the following description of the drawing, illustrating a preferred embodiment of the invention, and wherein:

Figure 1 is a plan view of one side of the gauge shown as it will appear when applied to a door jamb for locating a hinge leaf;

Figure 2 is a sectional view taken substantially along a plane as indicated by the line 2—2 of Figure 1 and showing the gauge in end elevation;

Figure 3 is a side elevational view of the gauge looking from right to left of Figure 1 and showing the gauge as it will appear applied to a door jamb for marking off the depth of a mortise for a hinge leaf;

Figure 4 is a plan view showing the gauge inverted with respect to its position of Figure 1 and applied to a door for locating a hinge thereon;

Figure 5 is an end elevational view of the gauge including a portion of the door shown in section, taken substantially along a plane as indicated by the line 5—5 of Figure 4;

Figure 6 is an elevational view of a door and door frame showing the door in a closed position;

Figure 7 is an enlarged sectional view taken substantially along a plane as indicated by the line 7—7 of Figure 6 showing a portion of the door and a portion of the gauge applied thereto for locating the strike plate;

Figure 8 is a horizontal sectional view taken substantially along a plane as indicated by the line 8—8 of Figure 7 and showing the gauge in its position of Figure 7 and in its relationship to the door and door jamb;

Figure 9 is a view looking in the opposite direction to Figure 7 and showing the mark made by the gauge for locating the strike plate on the door jamb;

Figure 10 is a plan view of the gauge in its position of Figure 1 but showing the gauge applied to a door for locating a lock or latch or for locating the door handle, and Figure 11 is a vertical sectional view taken substantially along a plane as indicated by the line 11—11 of Figure 10.

Referring more specifically to the drawing, a combination door and jamb gauge in its entirety is designated generally 12 and comprises a substantially rigid plate formed of any suitable material which is relatively stiff, such as stainless steel. The plate forming the gauge 12 may be of various sizes depending upon the size of hinges with which it is to be employed but it is ordinarily preferably approximately five and one-half inches in length and five inches in width, for use with door hinges of a conventional size. One longitudinal edge 13 of the plate forming the gauge 12 is provided with an elongated notch extending longitudinally of the gauge defining a straight edge 14 which is inwardly offset with respect to the longitudinal side edge 13. The notch also forms transversely extending parallel edges 15 defining the ends of the notch and which project at right angles from the ends of the longitudinal edge 14. The two ends 16 and 17 of the gauge 12 are provided with extensions 18 adjacent the longitudinal edge 13. The gauge plate 12 is also provided with an integral tongue 19 forming an extension of each of the ends 16 and 17 and which tongues 19 project in the same direction at right angles from the plane of the gauge 12. The tongues 19 are located adjacent the extensions 18 and at right angles thereto, as best illustrated in Figures 1 and 4.

The plate forming the gauge 12 is provided with a struck up portion along its other longitudinal edge forming a wall or flange 20 which projects from the plane of the plate at substantially a right angle thereto and in the opposite direction to the tongues 19. The flange or wall 20 extends longitudinally of the gauge 12 from its end 17 to near its end 16. The end of the flange or wall 20 at the end thereof remote to the end 17 is provided with a notch 21 which opens outwardly of its outer edge and outwardly of said last mentioned end and said flange or wall 20 is provided with an integral tapered tongue 22 extending therefrom into the inner end of the notch 21, as best illustrated in Figures 3 and 11. The other end of the flange or wall 20, which is contiguous to the end 17 is provided with two spaced V-shaped notches 23 and 24. As best illustrated in Figure 10, the end 17 of the gauge is provided with a V-shaped notch 25 disposed adjacent the tongue 19 which projects from said end. The side edge portion of the gauge plate, remote to the longitudinal edge 13 and between the end 16 and the wall 20 forms an extension 26 which is disposed in substantially the same plane as the main portion of the gauge plate. The corners of the outer end of the extension 26 are bent to form pointed prongs 27 which extend from the same side or face of the gauge plate as the flange 20. The inner edge of the extension 26, adjacent its inner end and near one end of the wall 20 is provided with a tapered pointed prong 28 which projects from said edge.

A portion of the gauge plate located near the end 16 is provided with two transversely spaced openings 29 forming a pair of openings and said gauge plate is provided with a plurality of pairs of openings 30 disposed nearer to the end 17 and wherein the two openings of each pair of openings 30 are similarly spaced transversely with respect to one another. Likewise, the various pairs of openings 30 are longitudinally spaced relatively to one another with respect to the gauge plate.

Figures 1 and 2 show the gauge 12 as it will be applied to a jamb surface 31 and with the gauge disposed so that the tongues 19 extend away from the surface 31. It will be noted that the longitudinal edge 13 is disposed against a wall or surface 33 of a center rail or rib 32 of the jamb and which extends outwardly from the jamb surface 31, so that the edge 14 of the gauge is spaced from the rib wall 33. With the gauge thus disposed, as illustrated in Figures 1 and 2, a suitable instrument, not shown, may be used to scratch a line on the jamb surface 31 along the edge 14 and which will properly locate the inner edge of a mortise to be formed in the jamb surface 31 for a leaf 34 of a door hinge 35, which is shown in dotted lines in Figure 1 in the position it will assume after being applied to and mortised in the jamb surface 31. Likewise, the notch formed by the edges 14 and 15 is of a length corresponding to the length of a conventional hinge leaf so that, if desired, the edges 15 may be employed for marking the jamb surface 31 to indicate the location of the ends and the mortise to be formed for the hinge leaf 34. The gauge 12 is then turned clockwise through an arc of 90° from its position of Figures 1 and 2 and positioned as illustrated in Figure 3 with the longer edge of the notch 21 resting on the jamb surface 31 and the tapered prong 22 bearing against the side edge 36 of the jamb. With the gauge 12 thus disposed, it is slid longitudinally of the jamb so that the prong 22 will form a scratch mark in the jamb surface 36 indicating the depth of the mortise to be cut in the jamb to receive the hinge leafs 34. It will thus be readily apparent that the hinge leaves 34 can be accurately mortised into the jamb surface 31.

The gauge 12 is then inverted and the extensions 18 thereof are positioned against an edge 37 of a door 38 and with the longitudinal edges of the tongues 19, which are located adjacent the extensions 18, abutting one side of the door 37. With the gauge 12 thus positioned, as illustrated in Figure 4, the edges 14 and 15 may be used for marking off a mortise to be formed in the door edge 37 to receive the other leaf 39 of the hinge 35. The gauge 12 can then be positioned so that the outer side of its wall 20 is disposed against the door edge 37 with the gauge portion 26 disposed adjacent the opposite side of the door 38 to the side thereof engaged by the tongues 19, as illustrated in Figures 4 and 5, so that the gauge may then be employed for making a scratch line along said other side of the door 38 by means of the tapered prong 28 to thus mark off the depth of the mortise to be cut in the door edge 37. Likewise, if desired, the pointed prong 22 may be employed in the same manner as illustrated in Figure 3 for scratching a line to designate the depth of the mortise for the door edge 37. It will be readily apparent that mortises may be thus formed in the surface 31 and door edge 37 for each of the hinges to be employed for hanging the door 38. Thus, the hinge leaves can be accurately located and secured in the jamb surface 31 and door edge 37 for accurately hanging the door 38.

The gauge 12 is then positioned against one side of the door 38 at a desired level above its bottom edge and with the wall 20 disposed against the other, free edge 40 of the door 38, as illustrated in Figures 10 and 11. The notches 23 and 24 are spaced from the plane of the surface of the gauge 12 adjacent said notches a distance corresponding to one-half the thickness of doors of the two most common conventional thicknesses. Assuming that the door 38 is of the greatest conventional thickness, notch 24 will then be located intermediate of the opposite sides of the door so that said notch 24 may be used to mark the center of the door with respect to its opposite sides, as indicated by the center line 41 in Figure 11. Without moving the gauge 12, a mark is made in one side of the door through the notch 25, as illustrated in Figure 10. In this manner the centers are located for boring the hole in the side of the door with the center of the bored hole located at the mark formed by the notch 25 and by boring a recess in the edge 40 of the door with a center as formed by the mark 24, for accurately applying a lock to the door. The notch 24 would ordinarily be located for use with doors of 1¾ inch thickness while the notch 23 will be employed with doors of 1⅜ inch thickness, these being the two thicknesses of conventional doors. After the holes have thus been accurately bored and the lock 42 has been applied to the door 38, as illustrated in Figures 6, 7 and 8, the door 38 is positioned in a fully closed position in the door frame, as illustrated in Figures 6 and 8, and so that a side of the door 38, adjacent its free edge 40, is disposed against a side 33a of the jamb rail 32a located at the side of the frame opposite to the hinge jamb. The lock 42 is released so that the latch bolt 43 can extend from the door edge 40 against the jamb surface 31a, located on one side of the rib or rail 32a. The gauge portion 26 is then inserted between the door edge 40 and jamb surface 31a until the outer end of the portion 26 is disposed against the adjacent side of the latch bolt 43, as illustrated in Figures 7 and 8. The gauge 12 is then slid vertically with the outer edge of its portion 26 riding along the latch bolt 43 so that the prongs 27, which extend toward the jamb surface 31a, can scratch a straight line along the jamb surface 31a. The door 38 is then swung to an open position and the scratch line thus formed, as indicated at 44 in Figure 9, may then be extended to any desired length along the surface 31a and this line 44 is then employed to locate the strike plate 45 and so that one of the edges of the strike plate openings will align with the scratch line 44, as seen in Figure 9. When the strike plate 45 is secured, as thus positioned, to the surface 31a it will be correctly located to receive the bolt of the lock 42 in the bolt opening thereof. It will thus be readily apparent that a door may be accurately hung and the lock and strike plate accurately positioned by an unskilled worker with extreme accuracy and it will likewise be readily apparent that the gauge 12 may be used with efficiency by skilled carpenters to assist in accurately hanging doors and applying door locks and strike plates.

Assuming now that the door 38 as illustrated in Figure 10 represents a portion of a cabinet door and which is ordinarily substantially thinner than the door as shown in Figure 10, with the gauge 12 applied as illustrated in Figure 10, the two openings 29 and one of the four sets of transversely aligned pairs of openings 30 may be employed as a template for drilling holes through the cabinet door to receive the fastening screws of a cabinet door handle, not shown. The pairs of screws located at the ends of such handles are spaced different distances apart and after determining which of the four sets of openings 30 is spaced the correct distance from the openings 29 to correspond to the spacing between the fastening screws of the cabinet door handle, it will be readily apparent that holes may be accurately bored through the cabinet door to accurately receive the handle screws and thereby facilitate the accurate attachment of a handle to a cabinet door.

Various modifications and changes are contemplated and may obviously be resorted to, without departing from the spirit or scope of the invention as hereinafter defined by the appended claims.

I claim as my invention:

1. A gauge of the character described comprising a substantially rigid plate having a longitudinal side edge extending from end-to-end thereof provided with an elongated hinge leaf receiving notch formed therein and extending to adjacent the ends of said side edge, said notch having an inner straight edge disposed parallel to said side edge and parallel end edges merging with said side edge for use in conjunction with end portions of the side edge to locate a longitudinal edge of a hinge leaf mortise, one side of the plate providing a smooth flat surface adjacent said notch and which surface is adapted to bear flush against a surface in which the longitudinal edge of the hinge leaf mortise is to be located, a pair of tongues forming an integral part of said gauge and disposed at an angle to the plane of the gauge and extending from the other side thereof, and said tongues having corresponding edges facing toward said longitudinal side edge and offset relatively to the longitudinal edge of said notch in a direction away from said side edge and being spaced equal distances from said side edge, said tongues being disposed beyond the ends of the notch and said tongue edges being disposed perpendicular to the plane of the plate and being adapted to engage a side of a door for locating the straight edge of the notch along an edge of the door and parallel to the door sides for correctly locating a longitudinal edge of a hinge leaf mortise in the door edge.

2. A gauge of the character described comprising an elongated substantially rigid plate having a side edge portion provided with an elongated hinge leaf receiving notch extending to adjacent the ends of the plate including an inner longitudinal edge offset relatively to aligned side edge portions of the plate disposed beyond the ends of said notch, said notch having end edges disposed at right angles to said longitudinal edge of the notch and merging with said aligned side edge portions, said plate having a smooth side surface adjacent said side edge portion adapted to engage flush against a surface in which a hinge leaf mortise is to be cut, said side edge portions cooperating with the straight edge of the notch for locating a longitudinal edge of a hinge leaf mortise on the last mentioned surface, tongues forming integral parts of said plate and projecting perpendicularly from the other side of the plate and from end portions thereof, and said tongues having corresponding aligned edges disposed perpendicular to the plane of the plate and facing toward said side edge portion of the plate, said aligned edges of the tongues being offset relatively to the longitudinal edge of said notch in a direction away from said side edge portion for cooperation with the longitudinal edge of the notch in locating the longitudinal edge of a hinge leaf mortise in a door edge.

3. A gauge as in claim 2, said plate including an integral wall portion disposed along the other side edge thereof projecting perpendicularly from the plane of the plate and extending longitudinally thereof, said wall projecting from the plane of the plate in the opposite direction to said tongues, the side of the plate from which the wall projects defining said smooth side surface, one end of said wall having spaced notches for cooperation with the flat intermediate portion of the plate for locating the centers of the opposite sides of doors of different thicknesses when said plate side is disposed against a side of the door, and a portion of an end of said plate disposed coplanar with said wall end and remote therefrom having a notch for cooperation with the said wall in locating the center of a lock bore to be formed through a door from side to side thereof.

WILLIAM C. CASSADY.

References Cited in the file of this patent

UNITED STATES PATENTS

| Number | Name | Date |
| --- | --- | --- |
| 1,534,757 | Aprile | Apr. 21, 1925 |
| 1,540,991 | Holmgren | June 9, 1925 |
| 1,635,752 | Johnson | July 12, 1927 |
| 1,849,961 | Snelling | Mar. 15, 1932 |
| 2,389,842 | Cummins | Nov. 27, 1945 |
| 2,561,619 | Giannini | July 24, 1951 |